United States Patent [19]

Liu

[11] Patent Number: 5,205,578
[45] Date of Patent: Apr. 27, 1993

[54] STRUCTURE OF FOLDING BABY CARRIAGE FRAME ASSEMBLY

[76] Inventor: Kun-Hei Liu, 2F., No. 32, Lane 200, Tung Hwa Street, Taipei, Taiwan

[21] Appl. No.: 885,829

[22] Filed: May 20, 1992

[51] Int. Cl.$^5$ .................................. B62B 7/06
[52] U.S. Cl. ............................ 280/642; 280/650
[58] Field of Search ............... 280/639, 38, 641, 642, 280/644, 649, 651, 657, 658; 297/DIG. 4

[56] References Cited

U.S. PATENT DOCUMENTS

| | | | |
|---|---|---|---|
| 4,529,219 | 7/1985 | Shamie | 280/642 |
| 4,610,460 | 9/1986 | Kassai | 280/642 |
| 4,632,421 | 12/1986 | Shamie | 280/642 |
| 4,907,818 | 3/1990 | Chai | 280/642 |

Primary Examiner—Richard M. Camby
Attorney, Agent, or Firm—Varndell Legal Group

[57] ABSTRACT

A baby folding carriage frame assembly including of a handle, a back support frame, one pair of side frames, a rear wheel frame, a front wheel frame, foot pedal lever, one pair of folding links, and two springs. The said handle has a corrugated hand-hold portion, a cross rod and a plurality of pairs of cushions integrally made from a plastic material through the process of injection molding. The back support frame has adjustment sheets integrally made from a plastic material through the process of injection molding. The rear wheel frame has connecting sheets, a plurality of pairs of cushions and transverse wheel axle integrally made from a plastic material through the process of injection molding. The front wheel frame has one pair of cushions and a transverse wheel axle integrally made from a plastic material through the process of injection molding.

3 Claims, 3 Drawing Sheets

STRUCTURE OF FOLDING BABY CARRIAGE FRAME ASSEMBLY

BACKGROUND AND SUMMARY OF THE INVENTION

The present invention relates to folding baby carriages, and more particularly, the present invention relates to a folding baby carriage frame assembly which is inexpensive to manufacture and easy to assemble.

FIG. 1 illustrates a folding baby carriage frame assembly according to the prior art, which is generally comprised of a handle, a back support frame, one pair of side frames, a rear wheel frame, a front wheel frame, a foot pedal lever, one pair of folding links, and two springs. These parts are made from a metal material and respectively pivotably connected by rivets and washers, and separate adjustment sheets, locating plates and connecting sheets. The parts of the folding carriage frame assembly are made from a metal material through the process of cutting, bending, finishing and coating. These complicated processing processes make the cost of the folding carriage frame assembly expensive. Because much parts and accessories are used, it is difficult to maintain a constant quality, and the assembly process of the folding carriage frame assembly becomes complicated. Still another disadvantage of this structure of folding carriage frame assembly is that special tools are required in doing the assembly process. Therefore, this structure of baby carriage frame assembly is generally set up at factory, and not suitable for a purchaser to do the assembly process by himself (herself). Furthermore, the metal parts and accessories of the folding carriage frame assembly may injure the hands or legs easily.

The present invention has been accomplished to eliminate the aforesaid disadvantages. It is therefore an object of the present invention to provide a folding baby carriage frame assembly which is simple and inexpensive to manufacture. It is another object of the present invention to provide a folding baby carriage frame assembly which is easy to assemble. To achieve the above objects and according to the present invention, the folding baby carriage frame assembly is comprised of a handle, a back support frame, one pair of side frames, a rear wheel frame, a front wheel frame, a foot pedal lever, one pair of folding links, and two springs. These parts are respectively made from a plastic material of high impact strength with cushions, adjustment sheets, locating plates or connecting sheets directly formed thereon. Therefore, separate washers, adjustment sheets, locating plates and connecting sheets are not required, and the assembly process of the folding baby carriage frame becomes easy.

DETAILED DESCRIPTION OF THE PREFERRED EMBODIMENT

Figure 1:
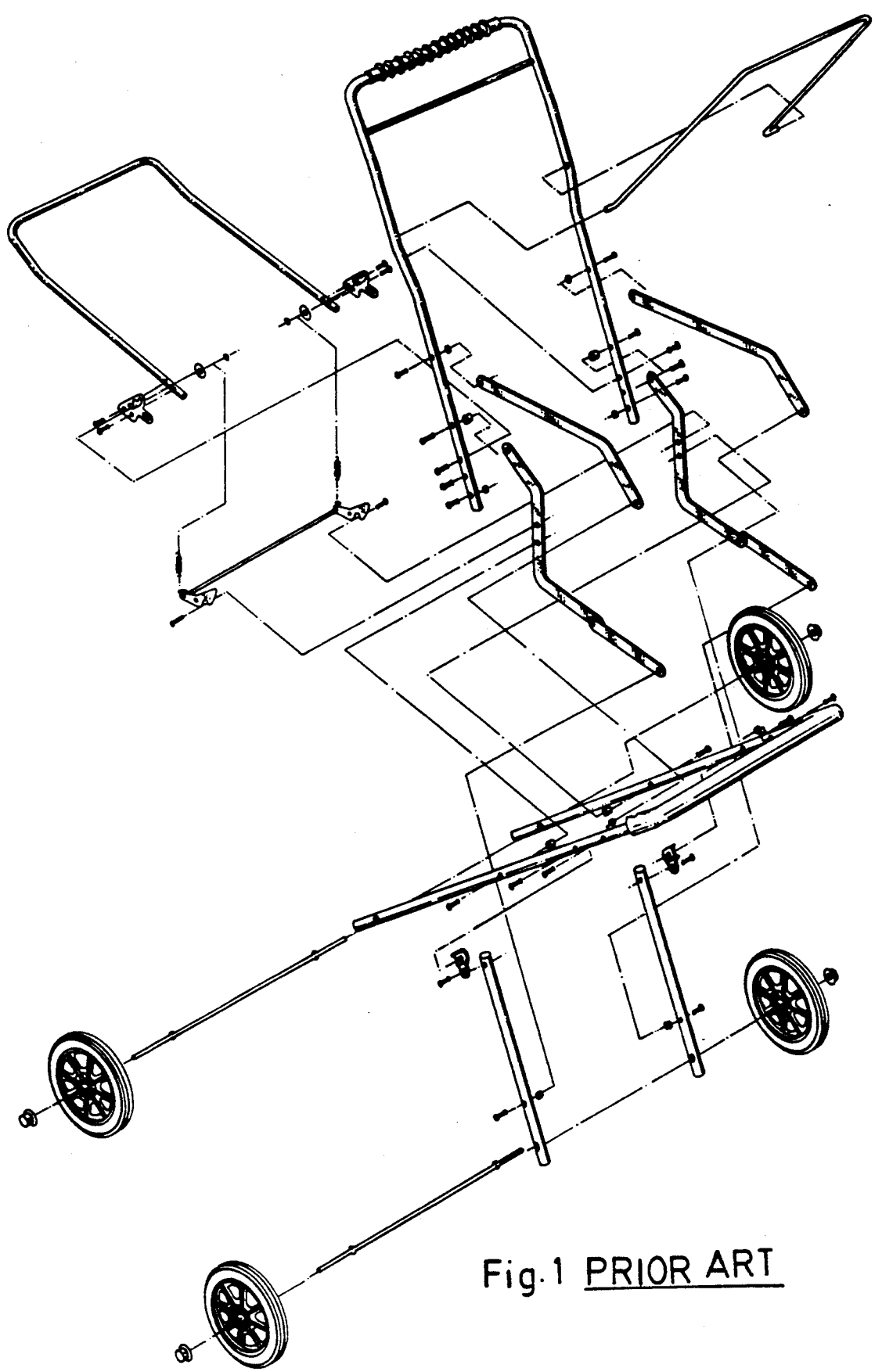
FIG. 1 is an exploded view of a prior art folding baby carriage frame assembly.
Figure 2:
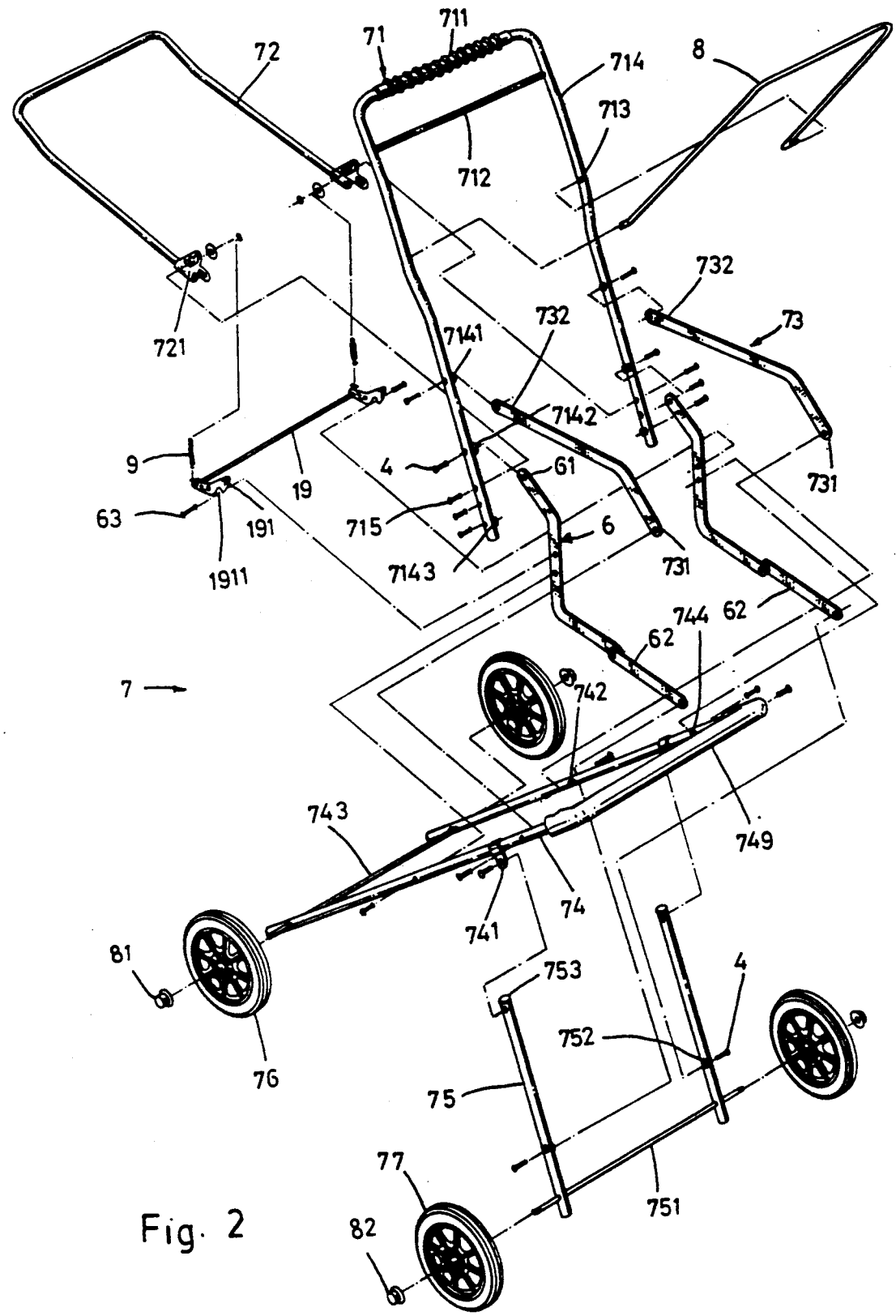
FIG. 2 is an exploded view of the preferred embodiment of the folding baby carriage frame assembly of the present invention.
Figure 3:
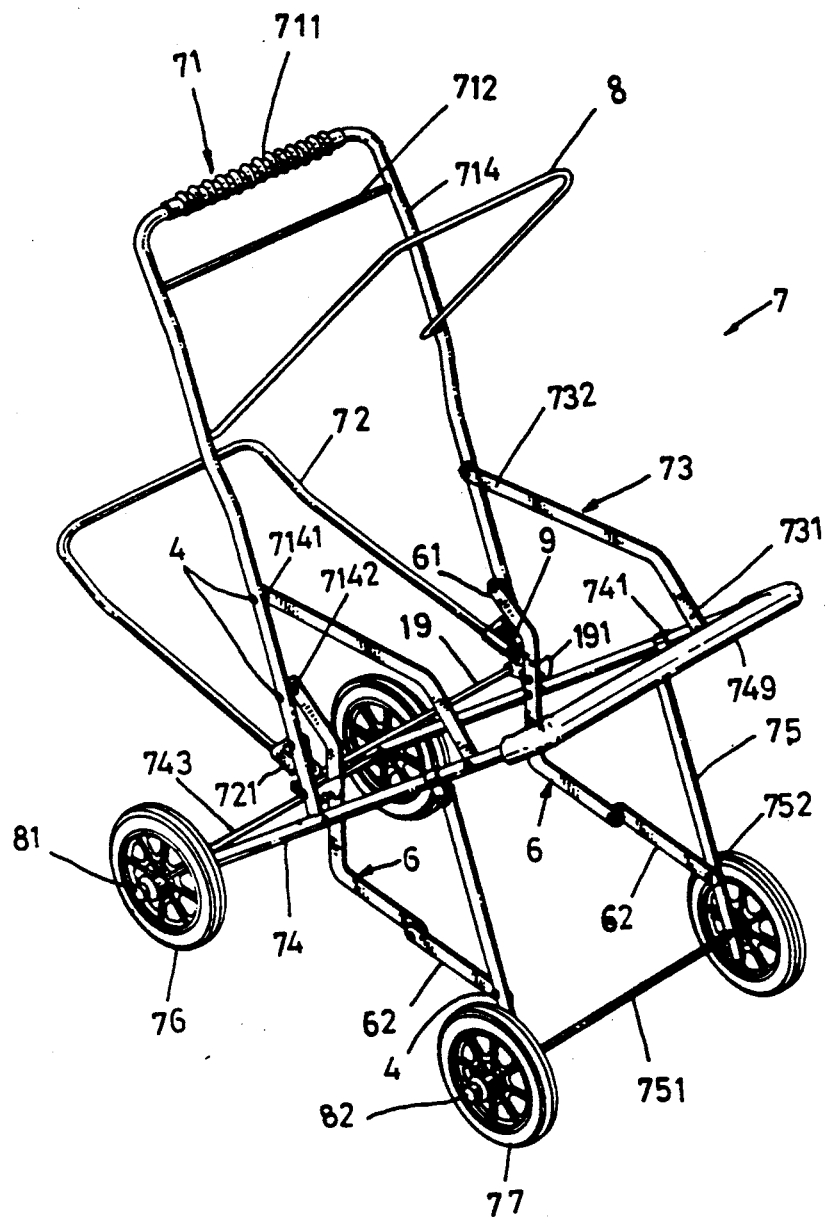
FIG. 3 is an elevational view of the preferred embodiment of the folding baby carriage frame assembly of the present invention.

Referring to FIGS. 2 and 3, therein illustrated is a folding baby carriage frame assembly 7 according to the present invention, which is generally comprised of a handle 71, a back support frame 72, one pair of side frames 73, a rear wheel frame 74, a front wheel frame 75, a foot pedal lever 19, one pair of folding links 6, and two springs 9. The handle 71 is made in a substantially U-shaped configuration formed of a corrugated hand-hold portion 711 and two parallel side rods 714. The side rods 714 are extended from the two opposite ends of the corrugated hand-hold portion 711 at right angles with a cross rod 712 connected therebetween. The side rods 714 have one pair of holes 713 at suitable locations into which the two opposite ends of the canopy frame 8 are inserted, an upper pair of cushions 7141 to which the pair of side frames 73 are connected by rivets 4, an intermediate pair of cushions 7142 to which the pair of folding links 6 are connected by rivets 4, a pair of projecting blocks 715 to which the back support frame 72 is connected, and a lower pair of cushions 7143 connected to the rear wheel frame 74 by rivets 4. The back support frame 72 is made in a substantially U-shaped configuration having two adjustment sheets 721 formed at the two opposite ends thereof respectively connected to the projecting blocks 715 of the handle 71. The two side frames 73 have each one end 731 pivoted to the rear wheel frame 74 and an opposite end 732 pivoted to the handle 71. The rear wheel frame 74 is covered with a cushion sleeve 749 at the top, and has an upper pair of cushions 744 to which the side frames 73 are connected by rivets 4, a pair of connecting sheets 741 to which the front wheel frame 75 are connected, a lower pair of cushions 742 to which the folding links 6 are connected by rivets 4, a transverse wheel axle 743 at the bottom onto which two rear wheels 76 are mounted at two opposite ends and secured in place by locknuts 81. The folding links 6 have each one end 61 respectively pivoted to the intermediate cushions 7142 of the handle 71 an intermediate part pivoted to the lower cushions 742 of the rear wheel frame 74, and an opposite end 62 pivoted to the front wheel frame 75. The folding links 6 comprise stub rods 63 onto which the foot pedal lever 19 is hooked. The front wheel frame 75 has two opposite ends 753 respectively connected to the connecting sheets 741 of the rear wheel frame 74 by rivets 4, a pair of cushions 752 at the middle to which the folding links 6 are pivoted, and a transverse wheel axle 751 at the bottom onto which two front wheels 77 are mounted at two opposite ends and secured in place by locknuts 82.

The foot pedal lever 19 has two retaining notches 1911 on two locating plates 191 at two opposite ends thereof respectively hooked on the stub rods 63 of the folding links 6. The two springs 9 are respectively connected between the locating plates 191 of the foot pedal lever 19 and the adjustment sheets 721 of the back support frame 72.

In the aforesaid structures, the handle 71 and the corrugated hand-hold portion 711, the parallel side rods 714, the cross rod 712, the upper pair of cushions 7141, the intermediate pair of cushions 7142, the projecting blocks 715 and the lower pair of cushions 7143 thereof are integrally made from a plastic material through the process of injection molding; the back support frame 72 and the adjustment sheets 721 thereof are integrally made from a plastic material through the process of injection molding; the rear wheel frame 74 and the connecting sheets 741, the upper pair of cushions 744, the lower pair of cushions 742 and the transverse wheel axle 743 thereof are integrally made from a plastic material through the process of injection molding; the front wheel frame 75 and the pair of cushions 752 and the transverse wheel axle 751 thereof are integrally made from a plastic material through the process of injection molding. According to the present invention, the plastic material to be used can be polypropylene, nylon, or any of a variety of plastic materials which provide high impact strength.

I claim:

1. A folding baby carriage frame assembly which comprises a handle, a back support frame, one pair of side frames, a rear wheel frame, a front wheel frame, foot pedal lever, one pair of folding links, and two springs, said handle including two parallel side rods, a corrugated hand-hold portion connected between respective ends of said parallel side rods and a cross rod connecting said two parallel side rods and spaced from said corrugated hand-hold portions, a canopy frame pivotally connected to said side rods by a pair of holes, a first upper pair of cushions pivotally connected to first respective ends of said side frames by rivets, an intermediate pair of cushions pivotally connected to said folding links, a pair of projecting blocks, and a first lower pair of cushions pivotally connected to said rear wheel frame by rivets;

said back support frame having two adjustment sheets formed at opposite ends thereof respectively connected to said projecting blocks of said handle;

said rear wheel frame having a second upper pair of side frames by rivets, a pair of connecting sheets pivotally connected to said front wheel frame, a second lower pair of cushions pivotally connected to said pair of folding links by rivets, a bottom including a transverse rear wheel axle, two rear wheels mounted at two opposite ends of said rear wheel axle and secured in place by locknuts;

said pair of folding links having stub rods; one end of said pair of folding links respectively pivoted to said first intermediate cushions of said handle, an intermediate part thereof respectively pivoted to said second lower cushions of said rear wheel frame, and an opposite end thereof respectively pivoted to said front wheel frame;

said front wheel frame having two opposite ends respectively connected to said connecting sheets of said rear wheel frame, a third pair of lower cushions respectively pivoted to said pair of folding links at said opposite end thereof, and a bottom including a transverse front wheel axle, two front wheels are mounted at two opposite ends of said front wheel axle and secured in place by locknuts;

said food pedal lever having two locating plates at opposite ends thereof, each said locating plate having a retaining notch thereon respectively hooked on said stub rods of said pair of folding links; said two springs being respectively connected between said locating plates of said food pedal lever and said adjustment sheets of said back support frame;

wherein said handle and said corrugated hand-hold portion, said parallel side rods, said cross rods, said first upper pair of cushions, said intermediate pair of cushions, said projecting blocks and said first lower pair of cushions thereof are integrally made of a plastic material by injection molding; said back support frame and said adjustment sheets thereof are integrally made of a plastic material by injection molding; said rear wheel frame and said connecting sheets, said second upper pair of cushions, said second lower pair of cushions and said transverse wheel axle thereof are integrally made of a plastic material by injection molding; said front wheel frame and said third lower pair of cushions and said transverse wheel axle thereof are integrally made of a plastic material by injection molding.

2. The folding baby carriage frame assembly of claim 1, wherein said plastic material is one of polypropylene and nylon.

3. The folding baby carriage frame assembly of claim 1, wherein said plastic material is a plastic material which provides high impact strength.

* * * * *